United States Patent [19]

Brown

[11] Patent Number: 5,572,560
[45] Date of Patent: Nov. 5, 1996

[54] BWR FUEL ASSEMBLY HAVING FUEL RODS WITH VARIABLE FUEL ROD PITCHES

[75] Inventor: Charles A. Brown, Kennewick, Wash.

[73] Assignee: Siemens Power Corporation, Richland, Wash.

[21] Appl. No.: 496,809

[22] Filed: Jun. 29, 1995

[51] Int. Cl.[6] .................................................. G21C 3/32
[52] U.S. Cl. ........................ 376/435; 376/444; 376/438; 376/434; 376/448
[58] Field of Search ..................... 376/435, 444, 376/438, 434, 448; 976/DIG. 74, DIG. 78, DIG. 66

[56] References Cited

U.S. PATENT DOCUMENTS

| | | | |
|---|---|---|---|
| 4,478,786 | 10/1984 | Andersson et al. | 376/444 |
| 4,795,608 | 1/1989 | Nylund | 376/444 |
| 4,913,876 | 4/1990 | Lettau et al. | 376/444 |
| 4,957,698 | 9/1990 | Ritter | 376/444 |
| 4,968,479 | 11/1990 | Ogiya et al. | 376/428 |
| 5,032,351 | 7/1991 | Johansson | 376/438 |
| 5,232,658 | 8/1993 | Lippert | 376/443 |
| 5,255,300 | 10/1993 | Patterson et al. | 376/423 |
| 5,434,898 | 7/1995 | Barkhurst | 376/438 |

Primary Examiner—Ngoclan Mai
Assistant Examiner—Meena Chelliah
Attorney, Agent, or Firm—Ira Lee Zebrak, Esq.

[57] ABSTRACT

A boiling water reactor fuel assembly with fuel rods having variable fuel rod pitches.

32 Claims, 6 Drawing Sheets

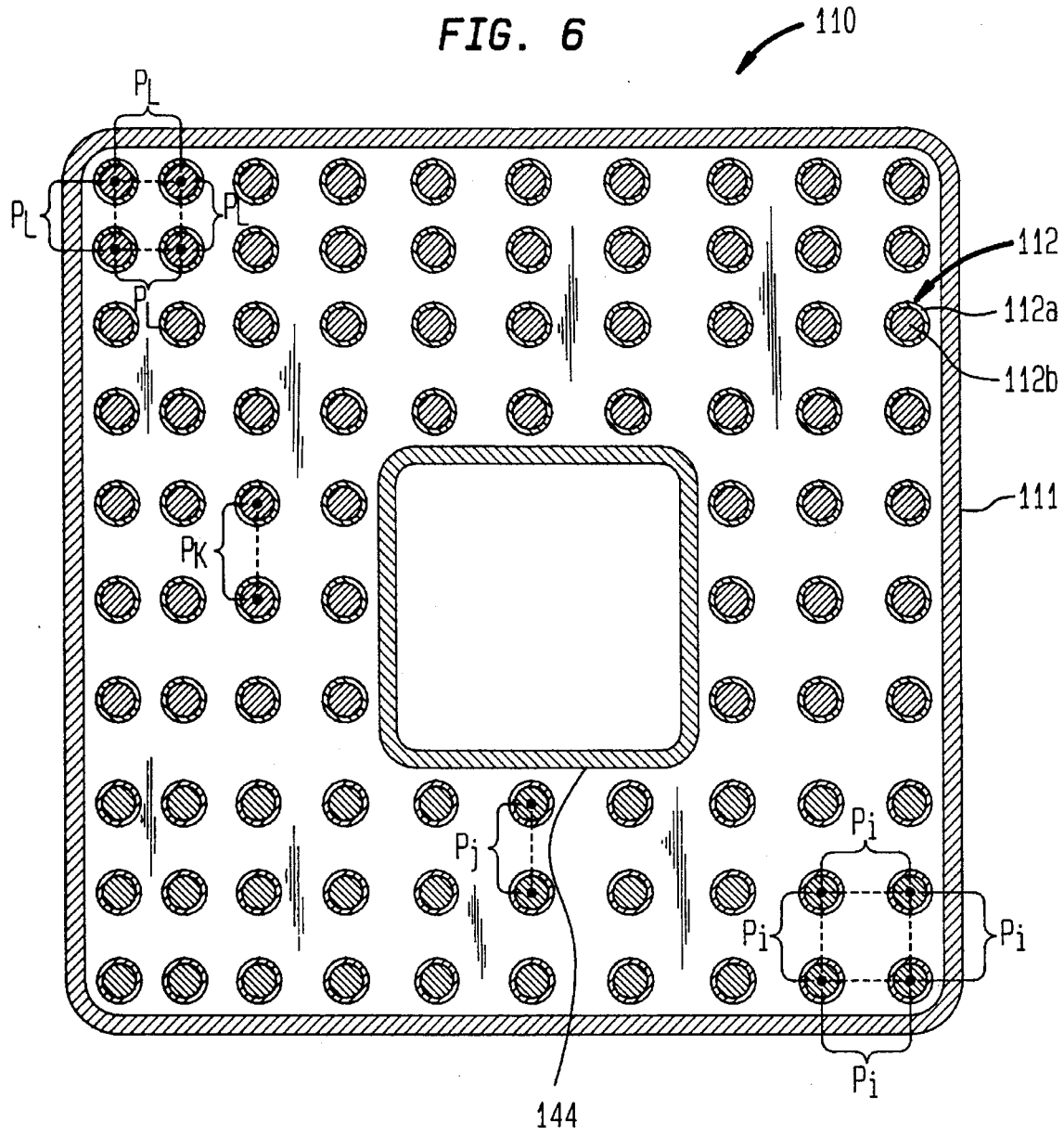

BWR FUEL ASSEMBLY HAVING FUEL RODS WITH VARIABLE FUEL ROD PITCHES

INTRODUCTION

1. Field of the Invention

The present invention relates to fuel assemblies for nuclear reactors, and in particular, to a fuel assembly for a boiling water reactor having fuel rods with varying pitch.

2. Background

In the nuclear reactors intended for the generation of power, nuclear fuel assemblies are customarily of the rod type in which elongated nuclear fuel rods are supported or positioned at their lower and upper ends between lower and upper tie plates respectively and which are arranged in closely spaced parallel arrays in generally square configurations. As is well known, each fuel assembly for a boiling water type of water cooled reactor is typically enclosed by an outer channel, usually square, which confines the coolant which enters that fuel assembly to that particular fuel assembly until it exits the assembly at the top of the reactor core. The coolant passing through the fuel assembly consists of a mixture of liquid water and steam. At the bottom entrance of the fuel assembly, the coolant is liquid water having a temperature at/or slightly below its saturation temperature. As coolant flows upward through the assembly, power is transferred from the fuel rods to the coolant, steam is produced, and the fraction of steam in the coolant is increased. At the top of the fuel assembly, the coolant which has been heated by the fuel rods is primarily steam. As a result of a high volume fraction of steam in the upper region of the reactor core, the upper region of the core becomes under-moderated and over-enriched due to the presence of too few hydrogen atoms compared to the number of fissionable uranium or plutonium atoms. As a consequence, less than optimum uranium utilization results.

Many attempts have been made in the prior art to increase the amount of moderator in the upper portions of a fuel assembly to improve neutronic efficiency. A commonly used design has been to incorporate one or more water rods, inner water channels or other coolant moderator flow conduits or paths within which single phase liquid water as the coolant moderator flows from the bottom of the assembly toward the top at a rate sufficient to prevent boiling of this flow. However, there are drawbacks to the designs which include such features. For example, a reduction in critical heat flux (CHF) performance occurs because the coolant moderator flow that must be supplied to the water rods/channels to preclude boiling inside these rods/channels occurs at the expense of the coolant moderator flow available for cooling the nuclear fuel rods.

It is known in boiling water reactor fuel designs to include within fuel assemblies part-length fuel rods in order to mitigate the over-enriched and under-moderated conditions in the upper region of the core. Accordingly, some of the fuel rods in a fuel assembly are truncated at some intermediate elevation in the core. This leaves an unfilled coolant channel above that elevation. By providing a truncated fuel rod, several important benefits are achieved. For example, there is a neutronic advantage in increasing the amount of fuel in the bottom of the core as compared to the top of the core. A more axial uniformity in water to fuel ratio is thereby achieved with an associated improvement in fuel cycle costs, increased shut-down margin, reduced pressure drop (principally because of increased flow area, but decreased wetted surface also reduces the pressure drop), and increased core stability because the pressure drop reduction occurs at the top part of the bundle where two phase pressure drops are most significant. However, by including part length fuel rods, the amount of fuel in the fuel assembly is decreased.

In addition to the upper region being under-moderated and over-enriched, a further problem in typical boiling water reactors is that the central region along the axes of the fuel assemblies may be under-moderated and over-enriched. In order to increase the amount of moderator so as to improve neutron moderation and economy, an elongated central water channel is provided which forms a centrally disposed path for the flow of moderator/coolant along the length of, but physically separated from, the fuel rods. The central water channel can have any cross-sectional area and/or geometry, positioned centrally and symmetrically within the outer channel, or asymmetrically displaced from the central axis within the outer channel, and can be oriented around its central axis so that its walls which extend the length of the assembly are either parallel or non-parallel to the walls of the outer channel. The central water channel can have a square cross-sectional area as described for example in U.S. Pat. No. 4,913,876 or an array of circular tubes or water rods extending along the length of the fuel assembly. Alternatively, the cross-sectional area of the central water channel is a cruciform and divides the rod array into quadrants as described for example in U.S. Pat. Nos. 4,478,786 and 4,795,608. Sufficient liquid coolant is circulated through the central channel to keep the contained coolant largely or completely in the liquid phase. The liquid moderator inside the water channel(s) not only increases moderation in the center of the assembly, but also increases moderation in the upper regions of the assembly. The presence of liquid as contrasted to gaseous moderator in the central region of the fuel assembly increases the nuclear performance of the assembly by providing a greater number of hydrogen atoms which functions, in part, to slow down neutrons and thereby increase the likelihood of further fissions.

Another important attribute of a central water channel is that the void coefficient of reactivity is less negative. By having the void coefficient of reactivity less negative, reactor stability improves by reducing the coupling between core reactivity and core moderator thermal hydraulic conditions. The moderator in the fuel assembly that is not within the central water channel and which is termed active coolant surrounds the nuclear fuel rods and is heated by means of conduction/convection. As reactivity increases, heating of the active coolant is increased. Increased heating of the active coolant results in greater steam void formation and a reduction in moderation. The increase in voids and reduced moderation results in reduced reactivity. Heating of the coolant/moderator which is within the central water channel is relatively small and is largely unaffected by the heat released from the fuel rods. Thus, an assembly with a central water channel has a greater fraction of moderator in the core that does not become void when reactivity increases. There is thus less decrease in reactivity to steam void formation.

Regardless of the particular configuration, each central water channel within a fuel assembly has an inlet disposed towards the bottom to allow subcooled liquid water to enter the central water channel and an outlet towards the top. The inlet subcooling and the flow rate inside the central water channel are such that the coolant which flows up inside the central water channel does not experience any significant boiling. The objective of incorporating such internal water channels is to increase the amount of liquid water within the fuel assembly and thus achieve increased neutron moderation in the center and top parts of the fuel assembly. The primary benefits of this increased moderation are improved fuel utilization and improved stability (e.g., less tendency towards coupled nuclear/thermal-hydraulic oscillations).

In order to increase the size of the center water channel and to thereby increase the moderation in the upper portion of the core, designs have been utilized in which the upper portions of selected fuel rods are removed in order to accommodate an expanding central water channel as described for example in U.S. Pat. No. 4,957,698 and U.S. Pat. No. 4,968,479 or in which the upper portion of selected fuel rods are removed and replaced with water rods in fluid communication with the center water channel as described for example in U.S. Pat. No. 5,255,300.

However, such designs which eliminate some or portions of some fuel rods thereby decrease the power generated by the fuel assembly. Similarly, if the diameter of the fuel rods adjacent the center water channel was decreased in order to accommodate the increasing size of the center water channel, the power generated by the assembly would decrease.

It would thus be an advantage over the prior art to have a fuel assembly with a central water channel that varies in cross-sectional area and/or shape while maintaining the diameter of the fuel rods as well as retaining the same number of fuel rods as in an assembly having a central water channel with a uniform cross-sectional area and thereby not decreasing the amount of power capable of being generated by the fuel assembly.

SUMMARY OF THE INVENTION

In accordance with one aspect of the invention, a nuclear fuel assembly for boiling water reactors is provided comprising a plurality of elongated nuclear fuel rods; a lower tie plate for positioning the bottom ends of the plurality of nuclear fuel rods in an array having an at least one pitch; an upper tie plate for positioning the top ends of the plurality of nuclear fuel rods; an outer channel surrounding the plurality of nuclear fuel rods for conducting coolant/moderator about the plurality of nuclear fuel rods from the bottom of the assembly toward the top of the assembly; a spacer for providing support of the fuel rods over the length of the assembly and located between the upper and lower tie plates for positioning the fuel rods in a second array having a second at least one pitch, said fuel rods passing through apertures in the spacer and being retained in spaced apart relationship by said spacer; an inner channel having at least one wall for conducting coolant/moderator through the inner channel from the bottom of the assembly toward the top of the assembly.

BRIEF DESCRIPTION OF THE DRAWINGS

FIG. 6 is a cross sectional view taken along line 6—6 of the fuel assembly shown in FIG. 4.

DETAILED DESCRIPTION

Figure 1:
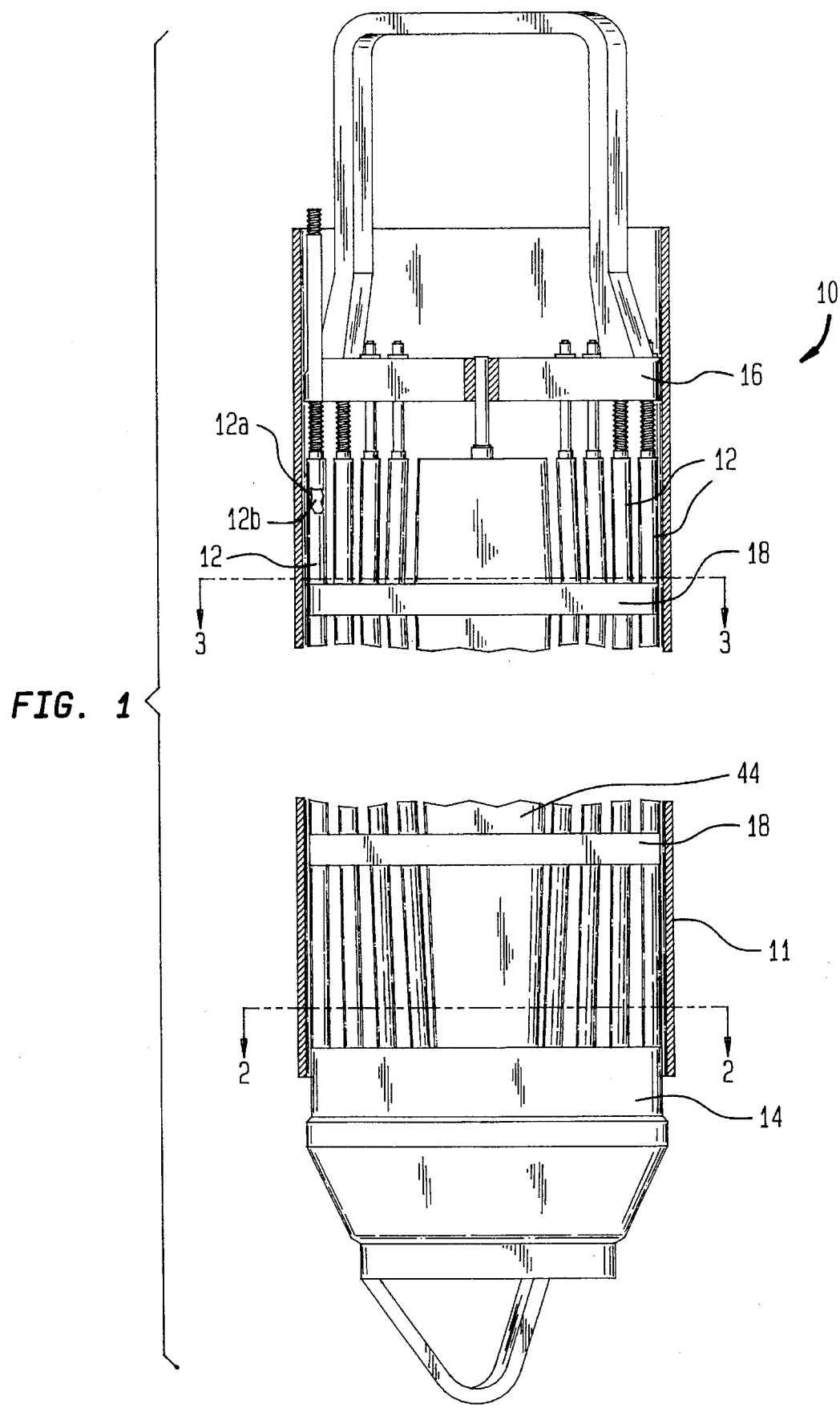
FIG. 1 is a side elevational view of a boiling water reactor nuclear fuel assembly according to the present invention.

Referring to FIG. 1, a boiling water reactor nuclear fuel assembly is generally shown at 10 having elongated fuel rods 12 each of which generally includes a zirconium alloy tube 12a within which are nuclear fuel pellets 12b. Fuel rods 12 have a uniform diameter along their length. The fuel rods are supported between a lower tie plate 14 and upper tie plate 16. The lower and upper tie plates can also or alternatively function to position the ends of the fuel rods in a spaced relationship. Fuel rods 12 pass through apertures or support cells in spacer grids 18, only two of which are shown in this fragmentary view. Spacer grids 18 provide intermediate support of fuel rods 12 over the length of fuel assembly 10 and position them in a spaced relationship while restraining them from lateral vibration. The fuel rod pitch or distance between the centerlines of adjacent fuel rods is maintained by the spacers. Outer square channel 11 is shown around the fuel rods 12 and spacers 18. Although a central water channel 44 is shown disposed in the center of the array of fuel rods 12 and replaces in this example the innermost three by three array of fuel rods, the present invention is not limited to fuel assemblies with central water channel(s) or water rod(s).

Assembly 10 houses an 11×11 fuel array although most of the fuel rods 12 are not shown for clarity of illustration. Although reference is made in the specification to an 11×11 fuel rod array with each fuel rod having an equal diameter, such an array has been selected for illustrative purposes only. The present invention can be used with other arrays including, but not limited to 8×8, 9×9, and 10×10.

Central water channel 44 is shown in this example with a square cross-sectional area which varies along the height of the fuel assembly. In accordance with the present invention, in order to accommodate the changing cross-sectional area of central water channel 44 but without changing the diameter of fuel rods 12 and without increasing the size of outer channel 11, the position and the distance between fuel rods 12 in the example shown in FIG. 1 varies along the height of the fuel assembly.

Figure 2:
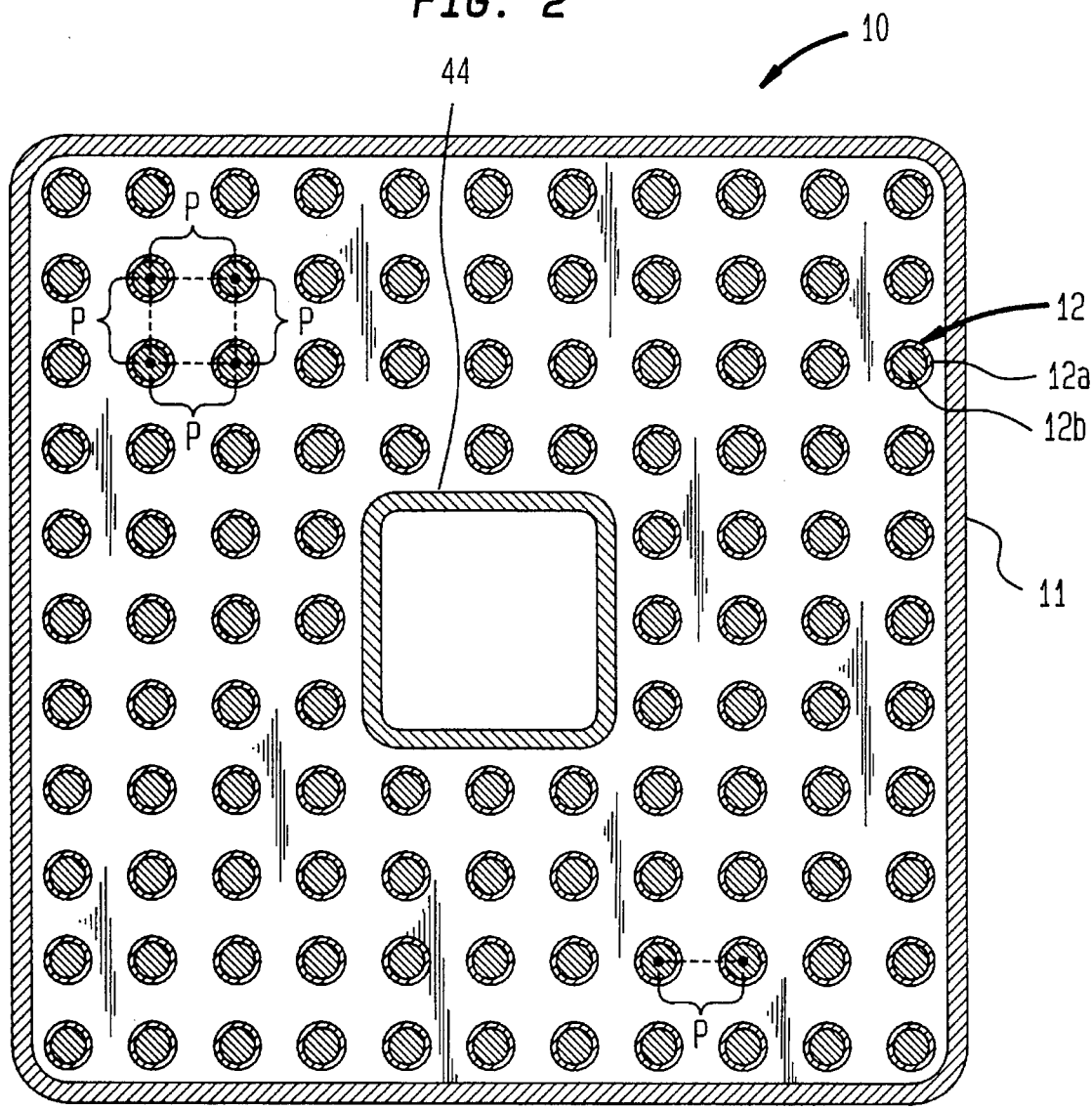
FIG. 2 is a cross sectional view taken along line 2—2 of the fuel assembly shown in FIG. 1.

Referring to FIG. 2 which is a cross-sectional view taken along line 2—2 of fuel assembly 10 shown in FIG. 1, central water channel 44 is at the center of the fuel assembly and the arrangement of the fuel rods is square with the distance between each fuel rod being the same. The pitch or distance between the centerlines of each fuel rod at the elevation shown in FIG. 2 is uniform and is designated by "P".

Figure 3:
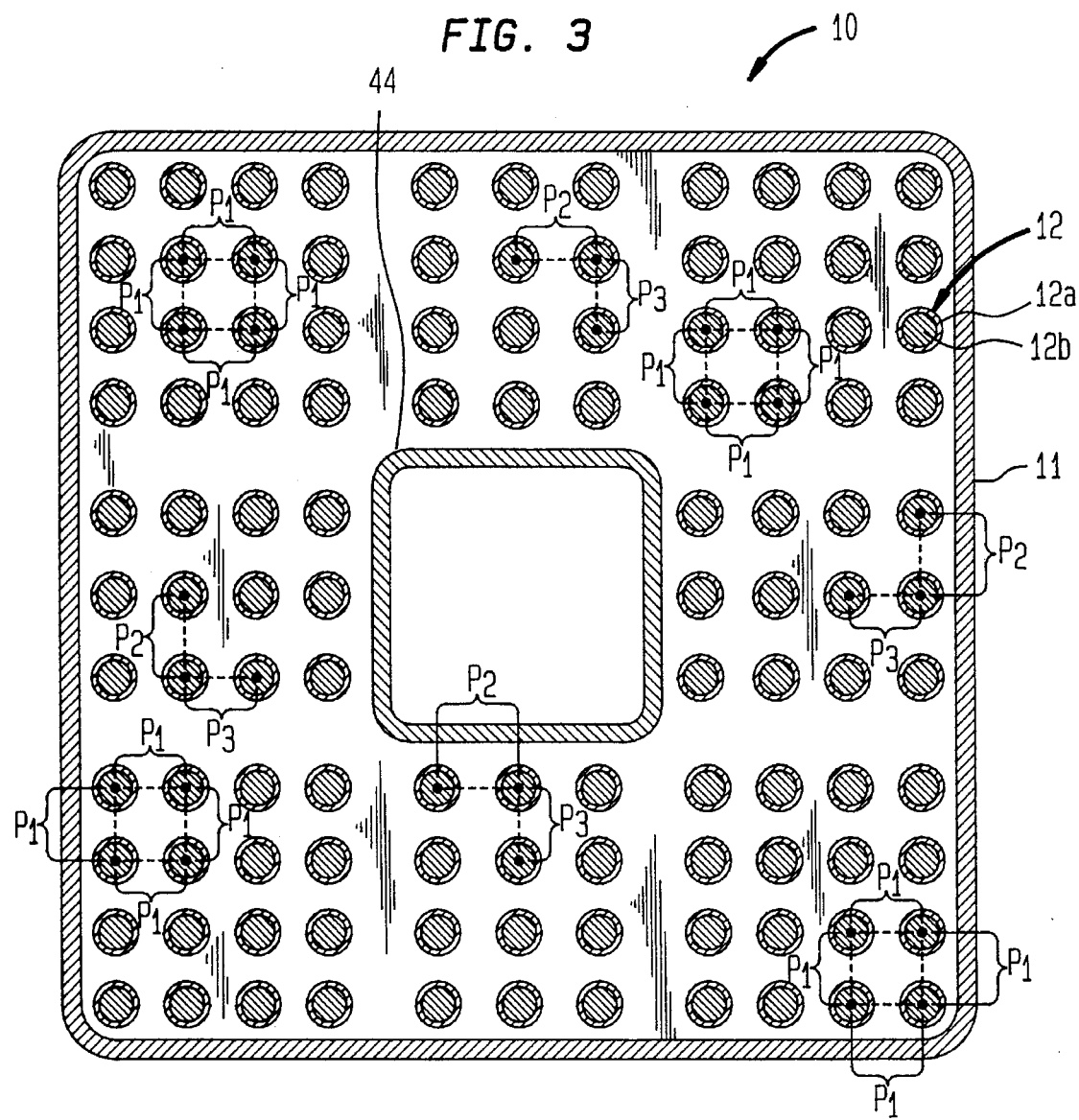
FIG. 3 is a cross sectional view taken along line 3—3 of the fuel assembly shown in FIG. 1.

Referring to FIG. 3 which is a cross-sectional view taken along line 3—3 of fuel assembly 10 shown in FIG. 1, the cross-sectional area of central water channel 44 is enlarged from that shown in FIG. 2. The cross-sectional area of central water channel 44 varies along the height of the fuel assembly and in the view shown in FIG. 3 has increased from its position in the lower portion of the fuel assembly (FIG. 2) toward the top of the fuel assembly where it achieves in this particular example its maximum cross-sectional area. Each of the four corner areas of the assembly shown in FIG. 3 has a 4×4 square array of fuel rods with a fuel rod pitch of $P_1$. Between each of the four corner areas are regions called flats where the fuel rods are arranged in a 3×4 or 4×3 rectangular array with fuel rod pitches of $P_2$ and $P_3$. In an array of fuel rods other than a square array such as the 3×4 or 4×3 rectangular array shown in FIG. 3., the pitch or distance between the centerlines of two adjacent fuel rods which extend in the radial direction away from the center of the fuel assembly is referred to as a radial pitch. In the 3×4 or 4×3 array, the four fuel rods in a row extend in the radial direction. An example of radial pitch is shown in FIG. 3 as $P_3$. Similarly, in an array of fuel rods other than a square array, the pitch or distance between the centerlines of two adjacent fuel rods which extend tangentially or circumferentially from the center of the fuel assembly is referred to as a tangential pitch. In the 3×4 or 4×3 array, the 3 fuel rods in a row extend tangentially. An example of a tangential pitch is shown in FIG. 3 as $P_2$.

In order to accommodate the larger cross-sectional area of the central water channel but without decreasing the fuel rod diameter and without using short or part length fuel rods, the fuel rod pitch changes from the lower elevation (FIG. 2) to the upper elevation (FIG. 3) of the fuel assembly. The pitch $P_1$ of each of the fuel rods in the 4×4 array of fuel rods in each of the four corner areas of fuel assembly 10 shown in FIG. 3 is smaller than the pitch P of the fuel rods in the corners at the elevation shown in FIG. 2. of the fuel assembly. The complete array shown in Fig. 3 is a combination square/rectangular array in which $P_1$ has been chosen to equal $P_3$, and $P_2$ has been chosen to be greater than $P_1$. Other values of the pitches $P_1$, $P_2$ and $P_3$ can be chosen.

In the embodiment shown in FIGS. 1–3, the fuel rod pitch at each of the intermediate elevations between the view shown in Fig. 2 and that in FIG. 3 varies from the pitch at the lower tie plate to the pitch of the upper spacer. Thus, the fuel rods extend from their positions in the uniform square array in the view shown in FIG. 2 to their positions in the combination square/rectangular array shown in FIG. 3. More particularly, the 4×4 square array in each of the corners of fuel assembly 10 and the 3×4 and 4×3 rectangular arrays in the flats of the assembly shown in FIG. 3 progress from the uniform square array in the view shown in FIG. 2. Thus, the pitch of the fuel rods in fuel assembly 10 can vary in the radial direction and/or in the tangential direction at each elevation of the fuel assembly (e.g. the corners and the flats) and can thus vary vertically or axially along the height of the fuel assembly. Although in the embodiment of the present invention shown in FIGS. 1–3 the fuel rod pitch varies from the lower portion of the assembly to the upper portion of the assembly, the pitch(es) could vary abruptly or may alternate from an increasing to a decreasing pitch (or vice versa) at selected elevations determined by the position of a spacer (or spacers) as shown for example in the region above the uppermost spacer in FIG. 1.

Varying the fuel rod pitch along the fuel assembly height permits positioning the fuel rods to take advantage of local moderator distribution so as to provide closer to the optimum local water to fuel ratios at different axial locations. In addition to improvements in local water to fuel ratio, rod positioning and pitch may be varied along the fuel assembly height to accommodate fuel assembly geometry changes which in turn enables selective control of the water to fuel ratio or the coolant flow areas. Such modifications could include increases or decreases in the center water channel cross-sectional area along the height of the assembly, or increases in the flow area within the outer channel which is accomplished by adjusting the rod pitch at selected axial locations.

As the coolant density decreases as a function of the height of the fuel assembly, there is an associated velocity increase which causes a proportionately higher pressure drop in the two phase flow region of the fuel assembly. A high two phase to single phase pressure drop ratio can be detrimental to core stability. For this reason strategies to increase coolant flow area and reduce pressure drop at the top of the assembly are sometimes employed. A change in the lateral rod positioning toward the top of the assembly may be beneficial, for example, by more effectively using the water channel exit flow or the flow from part length rods to improve the cooling of fuel rods at the top of the assembly.

The changes in fuel rod pitch may be accomplished by flexing the fuel rods laterally in the spans between grid spacers. Flexure of the fuel rod, for example, from one cell position in a square array in one span to an adjacent cell in the next span can be achieved without exceeding the yield strength of the fuel rod cladding. Such flexure can also be achieved without interference from the pellets as the relatively short pellet length and large pellet to clad diametral gap can accommodate the necessary clad curvature without pellet-clad interference.

By varying the fuel rod pitch radially, tangentially and axially in the fuel assembly, one can accommodate an inner or central water channel that varies in cross-sectional area as well as shape along the height of the fuel assembly without having to remove any fuel rod from the assembly. Furthermore, according to the invention, the size of the center water channel can be optimized axially by selectively changing its cross-sectional area as a function of the height of the assembly which can be accomplished by selectively changing the pitch of the fuel rods as a function of the height of the assembly.

With prior art fuel assemblies having uniform fuel rod pitch, increasing the size of the central water channel necessitates the removal of those fuel rods which occupy the space or volume into which the enlarged center water channel would extend, thereby decreasing the number of fuel rods in the fuel assembly. With non-uniform pitch, the center water channel size can be increased without necessarily removing any fuel rod. With prior art fuel assemblies having uniform pitch, if the fuel rods were not removed, then the shape of the central water channel which could be accommodated would have to be changed because of the physical position of the fuel rods.

Figure 4:
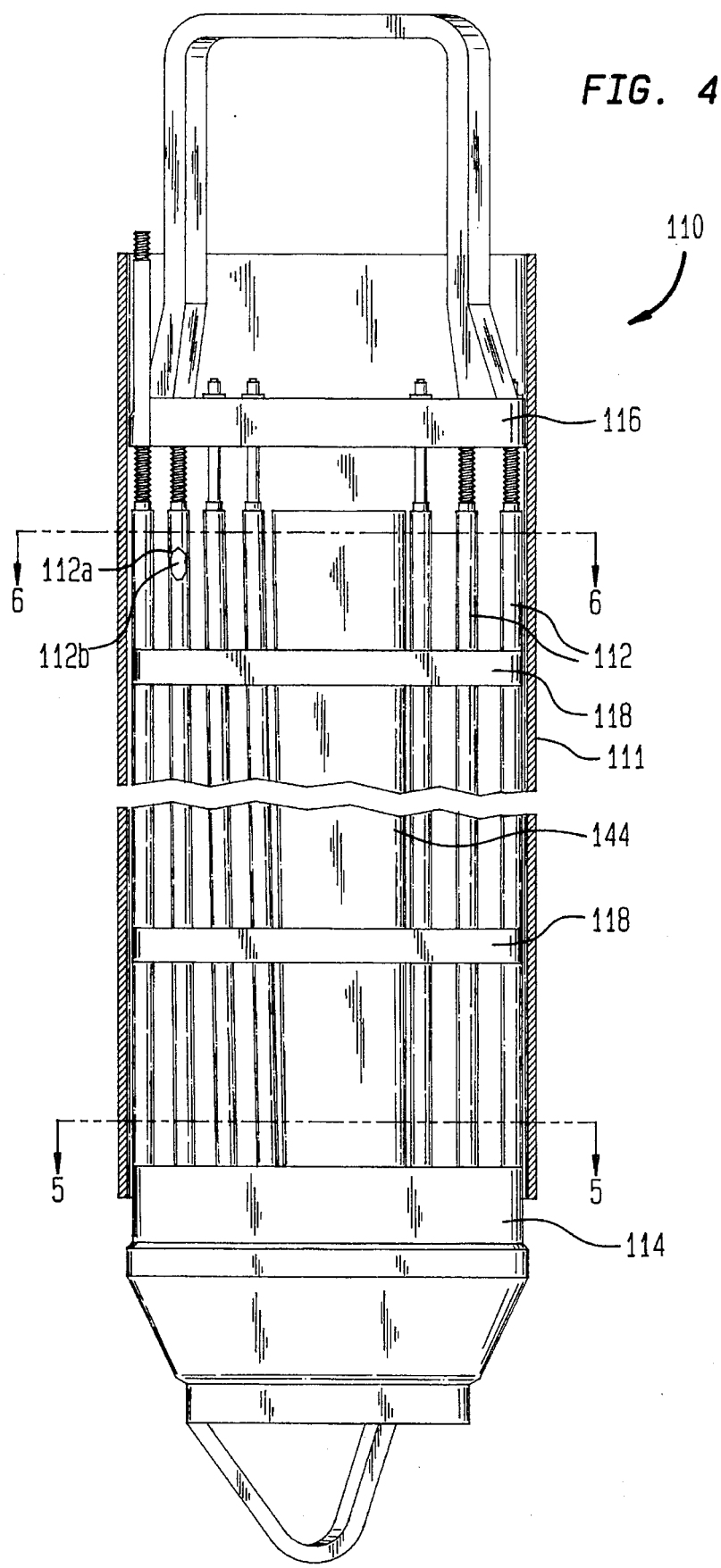
FIG. 4 is a side elevational view of a boiling water reactor nuclear fuel assembly according to an alternative embodiment of the present invention.

Referring to FIG. 4, an alternative embodiment of the present invention is shown in which a boiling water reactor nuclear fuel assembly is shown at 110 having elongated fuel rods 112 each of which generally includes a zirconium alloy tube 112a within which are nuclear fuel pellets 112b. Fuel rods 112 have a uniform diameter along their length with each fuel rod having an equal diameter. The fuel rods are supported between a lower tie plate 114 and an upper tie plate 116 and pass through apertures or support cells in spacer grids 118, only two of which are shown in this fragmentary view. The lower and upper tie plates can also or alternatively function to position the ends of the fuel rods in a spaced relationship. Spacer grids 118 provide intermediate support of fuel rods 112 over the length of fuel assembly 110 and position them in a spaced relationship while restraining them from lateral vibration. The fuel rod pitch is maintained by the spacers. A central water channel 144 is disposed toward the center of the array of fuel rods 112 and replaces a three by three fuel rod array disposed toward the center of the fuel assembly. Outer channel 111 is shown around the fuel rods 112 and spacers 118.

In those reactor assembly designs in which a structural connection is formed by the inner or central water channel to the upper and the lower tie plates, the spacers provide support for the fuel rods over the length of the assembly and position the fuel rods in an array with the fuel rods having a predetermined pitch or pitches.

Although assembly 110 houses a 10×10 fuel array, such an array has been selected for purposes of illustration only.

The embodiment shown in FIG. 4 can be used with other arrays including, but not limited to 8×8, 9×9, and 11×11.

Figure 5:
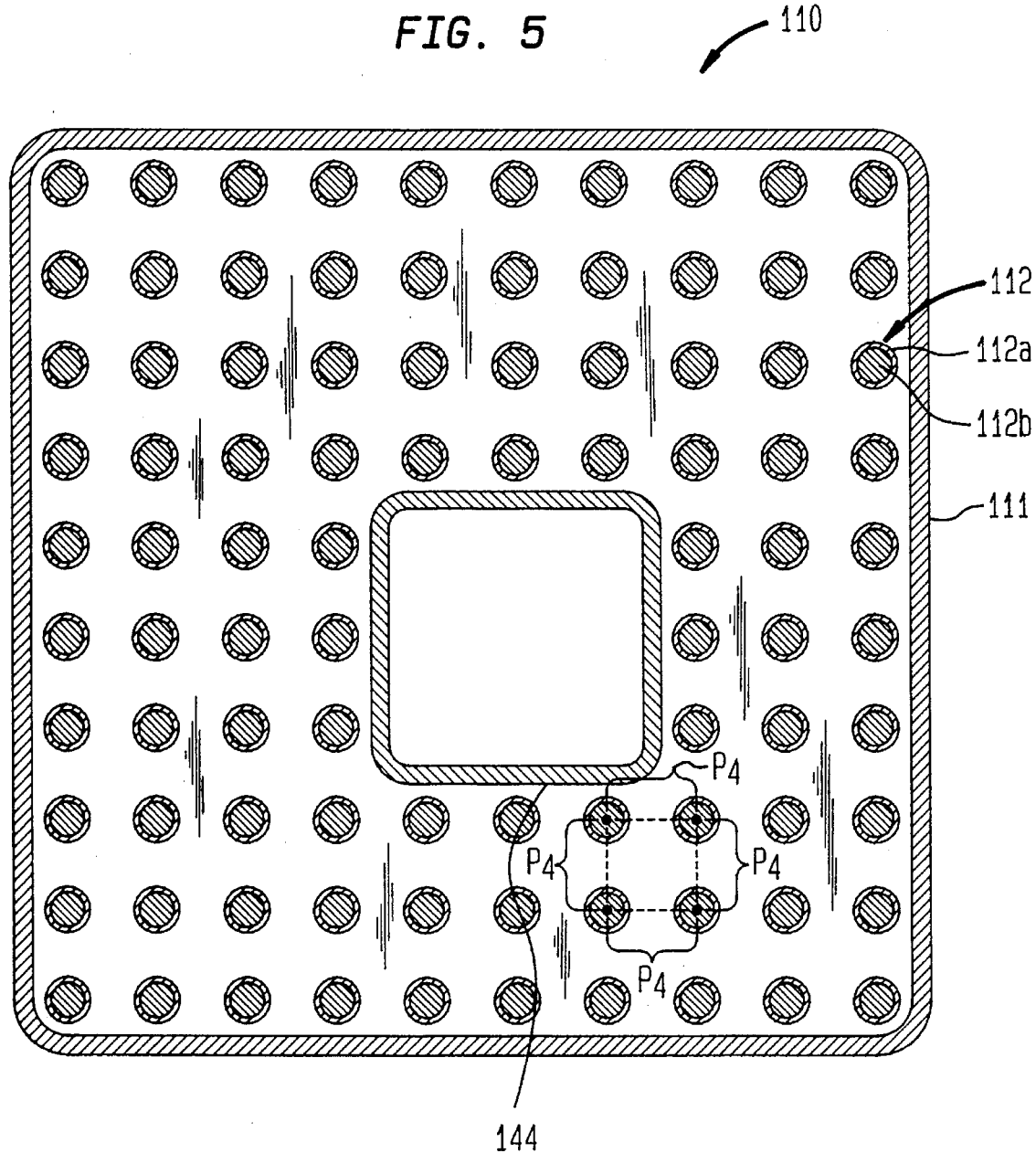
FIG. 5 is a cross sectional view taken along line 5—5 of the fuel assembly shown in FIG. 4.

Referring to FIG. 5 which is a cross-sectional view taken along line 5—5 of fuel assembly 110 shown in FIG. 4, the array of fuel rods is uniform and square, and their pitch is constant and designated by $P_4$.

Referring to FIG. 6 which is a cross-sectional view taken along line 6—6 of fuel assembly shown 10 in FIG. 4, central water channel 144 is enlarged from that shown in FIG. 5. The cross-sectional area of central water channel 144 has increased eccentrically from its position in the lower portion of fuel assembly 110 (FIG. 5) toward the top of the fuel assembly. The eccentrically expanding 3×3 central water channel 144 is more centrally located within the interior of the fuel assembly thereby enabling the selective positioning of increased moderation in the center as well as the upper portions of the fuel assembly.

In order to accommodate the larger cross-sectional area of the eccentrically expanded central water channel 144 but without decreasing the diameter of the fuel rods and without substituting short or part length fuel rods, the fuel rod pitch changes from a uniform pitch $p_4$ at a lower elevation of the fuel assembly (FIG. 5) to non-uniform pitches $P_i$, $P_j$, $P_k$, $P_L$, etc. at a higher elevation of the fuel assembly (FIG. 6).

The non-uniform pitches of the fuel rods shown in FIG. 6 varies from a square pitch $P_i$ in the bottom right corner of the assembly to smaller pitches (e.g. $P_j$, $P_k$) of combination square/rectangular arrays of fuel rods, to an even smaller pitch ($P_L$) of the square array of fuel rods shown in the opposite top left diagonal corner of the fuel assembly. In this example, $P_i$ has been chosen to equal $p_4$. Although the non-uniform pitches shown in FIG. 6 are shown to vary substantially continuously from one corner of the fuel assembly to the diagonally opposite corner, the variation and degree of variation can depend upon other factors or design choices. For example, selecting the radial pitch of the rods closest to the inner and/or outer channels to be smaller than the radial pitch of the intermediate rows of fuel rods results in a more uniform moderator to fuel ratio for all the rods in the assembly at the upper more voided region of the fuel assembly. Stated more broadly, since moderation is a function of the ratio of the amount of fuel to the amount of moderator, changing the fuel rod pitch changes the moderation. Thus, selectively changing the fuel rod pitch while maintaining uniform rod size allows changing or tailoring the moderation along the axial position of the fuel assembly.

While the foregoing description and drawings represent the preferred embodiments of the present invention, it will be apparent to those skilled in the art that various changes and modifications may be made therein without departing from the true spirit and scope of the present invention.

I claim:

1. A nuclear fuel assembly for boiling water reactors, comprising:

(a) a plurality of elongated nuclear fuel rods;

(b) a lower tie plate for positioning the bottom ends of the plurality of nuclear fuel rods in a first array having a first at least one pitch;

(c) an upper tie plate for positioning the top ends of the plurality of nuclear fuel rods;

(d) an outer channel surrounding the plurality of nuclear fuel rods for conducting coolant/moderator about the plurality of nuclear fuel rods from the bottom of the assembly toward the top of the assembly;

(e) a spacer for providing support of the plurality of fuel rods over the length of the assembly and located between the upper and lower tie plates for positioning the plurality of fuel rods in a second array having a second at least one pitch, said plurality of fuel rods passing through apertures in the spacer and being retained in spaced apart relationship by said spacer; and (f) an inner water channel having at least one wall for conducting coolant/moderator through the inner channel from the bottom of the assembly toward the top of the assembly.

2. The assembly as in claim 1 wherein the plurality of nuclear fuel rods is arranged in a 11×11 configuration and an innermost 3×3 array of fuel rods of the 11×11 configuration replaced by the inner channel.

3. The assembly as in claim 1 wherein the plurality of nuclear fuel rods is arranged in a 10×10 configuration and an innermost 3×3 array of fuel rods of the 10×10 configuration replaced by the inner channel.

4. The assembly as in claim 2 wherein the inner channel has a cross-sectional area which is substantially square.

5. The assembly as in claim 3 wherein the inner channel has a cross-sectional area which is substantially square.

6. The assembly as in claim 4 wherein the inner channel has a cross-sectional area which varies along the height of the inner channel.

7. The assembly as in claim 5 wherein the inner channel has a cross-sectional area which varies along the height of the inner channel.

8. The assembly as in claim 6 wherein the first array of nuclear fuel rods positioned by the lower tie plate is a square array.

9. The assembly as in claim 7 wherein the first array of nuclear fuel rods positioned by the lower tie plate is a square array.

10. The assembly as in claim 8 wherein the second array of nuclear fuel rods positioned by the spacer is a combination array comprising a square array and a rectangular array.

11. The assembly as in claim 9 wherein the second array of nuclear fuel rods positioned by the spacer is a combination array comprising a square array and a rectangular array.

12. The assembly as in claim 10 wherein the rectangular array of the combination array has two pitches.

13. The assembly as in claim 11 wherein the rectangular array of the combination array has two pitches.

14. The assembly as in claim 12 wherein the square array of the combination array is positioned in each of four corners of the assembly.

15. The assembly as in claim 13 wherein the square array of the combination array is positioned in each of four corners of the assembly.

16. The assembly as in claim 14 wherein the rectangular array of the combination array is positioned in each of the two flats of the assembly.

17. A nuclear fuel assembly for boiling water reactors, comprising:

(a) a plurality of elongated nuclear fuel rods;

(b) a lower tie plate for supporting the bottom ends of the plurality of nuclear fuel rods;

(c) an upper tie plate for supporting the top ends of the plurality of nuclear fuel rods;

(d) an inner water channel having a lower end connected to the lower tie plate and having an upper end connected to the upper tie plate, the inner water channel being adapted to form a flow path along its length for conducting coolant/moderator in the inner water channel from the bottom of the assembly toward the top of the assembly;

(e) an outer channel surrounding the plurality of nuclear fuel rods for conducting coolant/moderator about the plurality of nuclear fuel rods from the bottom of the assembly toward the top of the assembly;

(f) a first spacer for providing intermediate support of the plurality of fuel rods over the length of the assembly and located between the upper and lower tie plates for positioning the plurality of fuel rods in a first array having a first at least one pitch, said plurality of fuel rods passing through apertures in the first spacer and being retained in spaced apart relationship by said first spacer; and (g) a second spacer for providing intermediate support of the plurality of fuel rods over the length of the assembly and located between the first spacer and the upper tie plate for positioning the plurality of fuel rods in a second array having a second at least one pitch, said plurality of fuel rods passing through apertures in the second spacer and being retained in spaced apart relationship by said second spacer.

18. The assembly as in claim 17 wherein the plurality of nuclear fuel rods is arranged in a 11×11 configuration and an innermost 3×3 array of fuel rods of the 11×11 configuration replaced by the inner channel.

19. The assembly as in claim 17 wherein the plurality of nuclear fuel rods is arranged in a 10×10 configuration and an innermost 3×3 array of fuel rods of the 10×10 configuration replaced by the inner channel.

20. The assembly as in claim 18 wherein the inner channel has a cross-sectional area which is substantially square.

21. The assembly as in claim 19 wherein the inner channel has a cross-sectional area which is substantially square.

22. The assembly as in claim 20 wherein the inner channel has a cross-sectional area which varies along the height of the inner channel.

23. The assembly as in claim 21 wherein the inner channel has a cross-sectional area which varies along the height of the inner channel.

24. The assembly as in claim 22 wherein the first array of nuclear fuel rods positioned by the first spacer is a square array.

25. The assembly as in claim 23 wherein the first array of nuclear fuel rods positioned by the first spacer is a square array.

26. The assembly as in claim 24 wherein the second array of nuclear fuel rods positioned by the second spacer is a combination array comprising a square array and a rectangular array.

27. The assembly as in claim 25 wherein the second array of nuclear fuel rods positioned by the second spacer is a combination array comprising a square array and a rectangular array.

28. The assembly as in claim 26 wherein the rectangular array of the combination array has two pitches.

29. The assembly as in claim 27 wherein the rectangular array of the combination array has two pitches.

30. The assembly as in claim 28 wherein the square array of the combination array is positioned in each of four corners of the assembly.

31. The assembly as in claim 29 wherein the square array of the combination array is positioned in each of two corners of the assembly.

32. The assembly as in claim 30 wherein the rectangular array of the combination array is positioned in each of the four flats of the assembly.

* * * * *